United States Patent Office 3,419,502
Patented Dec. 31, 1968

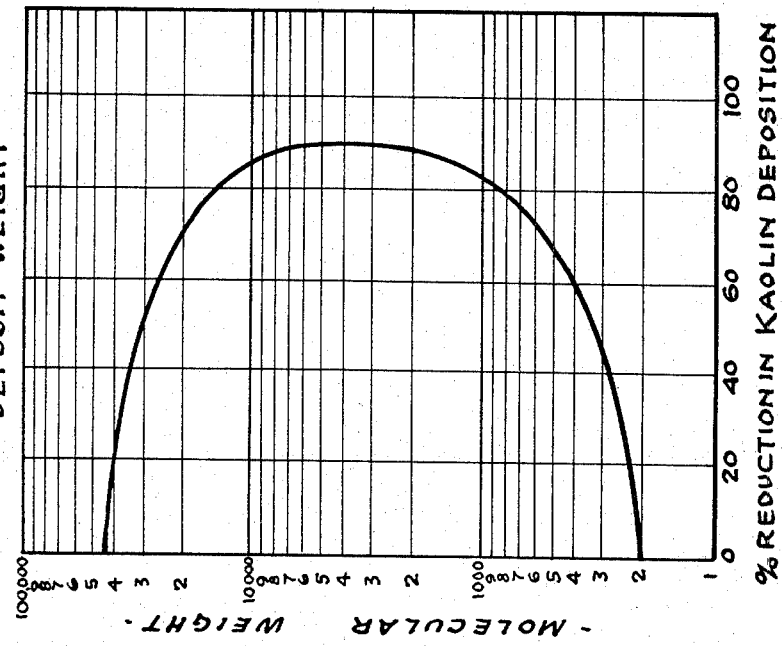
FIG. 2 ACTIVITY OF 2 ppm HYDROLYZED POLYACRYLONITRILE MOLECULAR WEIGHT VS REDUCTION IN KAOLIN DEPOSIT WEIGHT
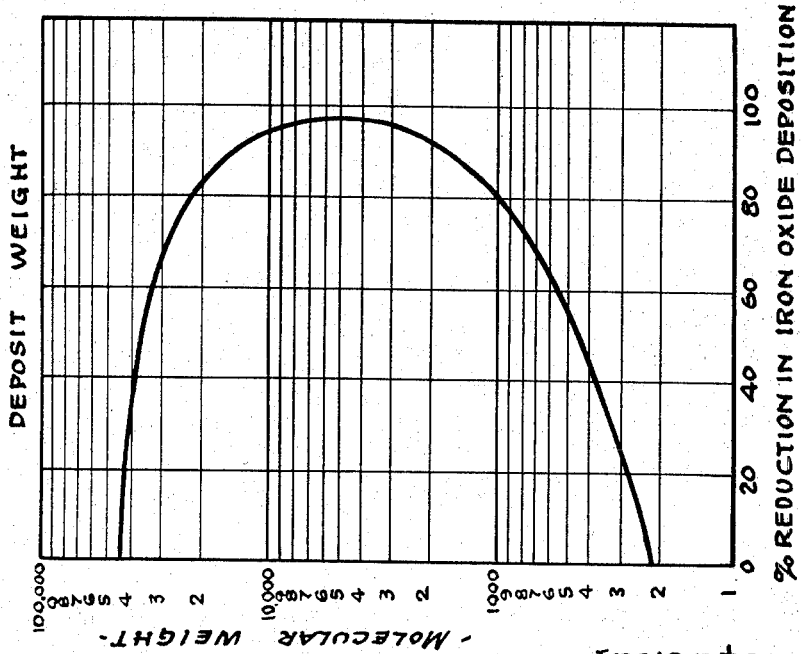
FIG. 1 ACTIVITY OF 1 ppm HYDROLYZED POLYACRYLONITRILE MOLECULAR WEIGHT VS REDUCTION IN IRON OXIDE DEPOSIT WEIGHT
Inventor
Theodore R. Newman
By *Mergell Johnston Cook Root*
Attorneys

3,419,502
PROCESS FOR DISPERSING SOLIDS IN AQUEOUS SYSTEMS
Theodore R. Newman, Oak Lawn, Ill., assignor to Nalco Chemical Company, Chicago, Ill., a corporation of Delaware
Continuation-in-part of application Ser. No. 400,921, Oct. 1, 1964. This application June 15, 1967, Ser. No. 646,337
8 Claims. (Cl. 252—180)

ABSTRACT OF THE DISCLOSURE

A process for dispersing and maintaining a dispersion of various solids that occur in surface waters. In the process, a particular hydrolyzed polyacrylonitrile polymer is added to the water. It is essential that the hydrolyzed polyacrylonitrile polymer be of low molecular weight. The molecular weight of the polymer should be no greater than 40,000. The use of low molecular weight hydrolyzed polyacrylonitrile polymers provides much improved results over the use of other suspension or dispersion materials as well as over high molecular weight acrylonitrile polymers of this type.

---

The present invention is a continuation-in-part of co-pending and now abandoned application Ser. No. 400,921 which was filed on Oct. 1, 1964. The invention is directed to a dispersing agent and to a method of dispersing and suspending particles in aqueous systems.

There are a substantial number of commercial operations wherein it is important to maintain various solids that are found in waters in a suspended or dispersed state. If such solids cease to be suspended in the liquid an accumulation of solids and fouling of equipment takes place. This is true, for example, in so-called once-through cooling systems. If there is a plentiful supply of water in close proximity to an industrial plant, cooling is often accomplished by passing the water through heat transfer equipment and then discharging the water back to its source. Because of the large quantities of water that are employed in this system it is not feasible from an economic standpoint to filter and/or treat the water in a conventional manner. For this reason deposit formation readily occurs and it is ordinarily necessary to stop the unit periodically for cleaning purposes. This results in loss of production time and requires costly chemical and/or mechanical cleaning procedures.

In the production of paper, solids such as titanium dioxide must be kept suspended in paper mill white waters. If such solids are deposited on the paper, spots form which reduce the strength and quality of the paper. Pitch that is found in white waters also should be kept in suspension. A suspending or dispersing agent which is effective in white waters at low concentration levels would therefore be of substantial value.

The shipping industry is also faced with the problem of deposit formation. Ore boats that travel the Great Lakes, for example, are equipped with ballast tanks which are filled during the return trip of the boat in order to adjust the level of the ship in the water. Water that is used to fill the tanks contains silt which rapidly accumulates in the tanks after several trips and adds significantly to the weight of the ships. This silt can only be removed from the tanks by difficult and time-consuming cleaning operations.

Dispersing or suspending agents are also of importance in the steel industry. In the production of clinkers that are used in blast furances, for example, large quantities of dust particles are formed. These particles are removed in a dust scrubber. If the solids are not maintained in a suspended condition in the cleaning liquid, the scrubber can only be operated for a short period of time. Under ordinary circumstances every week about thirty man hours are required to clean a single unit due to the fact that the solids deposit on the inner surfaces of the equipment, obstructing the passage of air and reducing the vacuum or suction in the system.

Still other areas in which dispersing agents are useful includes employment as detergent-type materials alone or with known detergents to clean out industrial reactors, in dish washers, in filter cloth clean-up, etc.

The above examples illustrate a few of the situations wherein a need exists for suspending and/or dispersing agents. These agents must be effective at low concentration levels. They should also be operable with a wide variety of solid contaminants.

It is an object of the present invention to provide a dispersant having wide applicability in liquid systems.

It is another object of the invention to provide a dispersant which is effective at very low treatment levels.

Another object is to provide a dispersant which can be used successfully in once-through cooling systems and which can be used to redisperse settled materials in cooling water systems.

Other objects will become apparent to those skilled in the art from the following detailed description of the invention.

In general, the invention is based on the discovery that particular hydrolyzed polyacrylonitrile polymers or polymers produced by a copolymerization reaction and having substantially the same structure are unusually effective when employed as dispersing or suspension agents in aqueous system. The hydrolyzed polyacrylonitrile polymer is usually applied in the form of an aqueous solution, although other polar solvents could be used and although it is also possible to apply the product in a dry form. Where an aqueous solution is employed, the solution contains from about 1 to 30% of hydrolyzed acrylonitrile. The lower limit depends upon economic considerations in that it is not economically feasible to ship and handle too great a quantity of water. The upper limit is determined by the viscosity of the solution. Most often the solution will contain from about 10 to 25% hydrolyzed acrylonitrile, and more preferably from 18 to 20% of hydrolyzed acrylonitrile. As will be pointed out more fully below, the molecular weight of the polymer is of critical importance. In general, the molecular weight of the polymer will be up to 40,000, and preferably from 800 to 30,000, and more preferably from 1,000 to 20,000. Molecular weight ranges of from 5,000 to 40,000, 10,000 to 30,000, and 15,000 to 20,000 have also been used with success. The polymer when added to cooling waters and the like at dosage levels in the range of 0.1 to 100 p.p.m., and preferably 0.5 to 10 p.p.m., is capable of dispersing a wide variety of materials such as clays, quartz, iron oxides, titanium dioxide, etc., that are found in natural surface waters, in paper mill white waters, in cement slurries, in ceramic slips, etc.

The major constituents of suspended matter occurring in natural surface waters are quartz, calcite, kaolinite, organic matter, oxides of iron, and generally minor amounts of illite and montmorillonite. The response to the subject polymeric dispersants in the molecular weight ranges set forth above has been found to be independent of the nature of the material in suspension. This indicates the nonspecificity of such dispersants. It also suggests that the principal mode of attachment of the polymer to the particles is through hydrogen bonding. This type of bonding occurs with molecules having hydrogen attached to a highly electronegative atom such as oxygen, nitrogen, or sulfur. The hydrogen associated with these highly electronegative atoms has lost much of its electronic atmosphere and, therefore, readily shares electrons with surface atoms of the solid particles. The formation of hydrogen bonds is a reversible phenomenon, and such systems are in a dynamic state. Bonds are constantly being formed and broken. In order to have firm attachment of a polymer to a surface, two requirements must be met, (1) the polymer must be large enough to provide many hydrogen bonds, and (2) the particle must provide sufficient sites for attachment so that a given polymer molecule will be associated with a given particle. If the polymer is too large, attachment can occur to more than one particle. When this happens, bridging between particles takes place and flocculation occurs. Flocculation begins to take place when the average molecular weight of partially hydrolyzed polyacrylonitrile exceeds 100,000. Dispersion does not occur with the monomeric and very low molecular weight species (less than about 250) because the period of attachment is too small. Therefore, it can be seen that a polymer with the proper functionality and stereoarrangement will act as a dispersant providing the molecular weight is in the necessary range, neither too large for bridging nor too small for poor bonding.

When a polymer which is a polyelectrolyte is firmly attached to a particle it affects the gross charge (zeta potential or mobility) on the particle. Most naturally occurring particles are negatively charged. Adsorption of a low molecular weight anionic polymer increases the negative charge. This increases the inter-particle repulsive forces thereby decreasing the tendency of particles to agglomerate and settle out. This phenomenon can be studied by the use of standard microelectrophoresis apparatus. The addition of 1 p.p.m. of hydrolyzed polyacrylonitrile to a suspension of 100 p.p.m. of kaolin in Chicago tap water, increased the negative particle mobility from −1.04 to −1.50 $\mu$/sec./v./cm. This corresponds to an increase in suspension stability of from a few hours for the untreated system to over three days. In practice, this effect will maintain the potential foulant particles in a suspended state during their passage through a cooling system.

The following examples are illustrative of the present invention.

EXAMPLE 1

This example shows a suitable process for preparing polyacrylonitrile. The ingredients that were used in the process include the following:

| Ingredient— | Parts (by weight) |
|---|---|
| Acrylonitrile | 14.7 |
| Water (deionized) | 51.0 |
| 10% ammonium persulfate solution | 6.9 |
| 10% sodium bisulfite solution | 27.4 |
| Total | 100.0 |

The acrylonitrile and water were mixed together in a flask equipped with an agitator, thermometer, and condenser and warmed to 50° C. The ammonium persulfate solution was added to the mixture and two minutes later the sodium bisulfite solution was added. Initiation of polymerization occurred almost immediately. The temperature, which had dropped to 45° C., was allowed to rise at 1.5–2.0 degrees/min. up to 64° C. with partial cooling. The reaction mixture was then cooled and maintained at 55° C. for 3½ hours. The solution was then heated to 80° C. for one-half hour under slight vacuum to remove traces of unreacted acrylonitrile.

There are several methods that can be used to hydrolyze the polyacrylonitrile. Probably the best method is to hydrolyze the polyacrylonitrile slurry with sodium hydroxide in an aqueous medium. One of the problems involved in this procedure is due to the high viscosity level that is reached during the initial stage of the hydrolysis. In order to avoid this difficulty, the polyacrylonitrile can be added to the hydrolyzing medium over a 50–90 minute period. In an illustrative hydrolysis treatment, 24.4 parts by weight of a 50% NaOH solution was placed in a clean reaction vessel equipped with a stirrer, thermometer, and reflux condenser and heated to 90° C. One hundred (100) parts by weight of a 14.7% polyacrylonitrile slurry in water was then fed continuously to the reaction vessel over a 50 minute period. After the last portion of polyacrylonitrile was added, the reaction was heated at 90–100° C. At regular intervals, samples were withdrawn, cooled rapidly to room temperature, and submitted for evaluation. Optimum properties were obtained with material that was hydrolyzed for 2.5–5.0 hours. Length of hydrolysis is dependent on temperature. Analysis by infrared indicated that the best products were composed of 20–30% amide and 70–80% carboxyl groups. The same is true where the dispersant is prepared by a copolymerization reaction such as by the copolymerization of acrylic acid and acrylamide.

The following table (Table 1) shows the reaction conditions used in preparing polyacrylonitriles of various molecular weights.

TABLE 1.—SYNTHESIS OF POLYACRYLONITRILES OF VARIOUS MOLECULAR WEIGHTS

| Product No. | Ingredients (by weight) | | | | Reaction conditions | | Intrinsic viscosity | Molecular weight |
|---|---|---|---|---|---|---|---|---|
| | ACN | H$_2$O | (NH$_4$)$_2$S$_2$O$_8$ | Na$_2$S$_2$O$_5$ | Temp., °C. | Time, hrs. | | |
| 1 | 265 | 1,120 | 1.4 | 5.5 | 50–55 | 2 | 4.50 | 490,000 |
| 2 | 265 | 1,220 | 3.45 | 13.8 | 50–55 | 2 | 1.83 | 148,000 |
| 3 | 265 | 1,680 | 13.8 | 55.2 | 50–55 | 4 | 0.40 | 19,500 |
| 4 | 265 | 1,680 | 13.8 | 55.2 | 50–55 | 3 | 0.385 | 18,500 |
| 5 | 265 | 1,680 | 13.8 | 55.2 | 55 | 3.5 | 0.378 | 18,000 |
| 6 | 265 | 1,680 | 13.8 | 55.2 | 70–90 | 1.5 | 0.297 | 13,000 |

The mol ratio of caustic to acrylonitrile that is used in the hydrolysis is important in determining the extent and rate of hydrolysis. Table 2 shows the composition of products hydrolyzed for 17 to 19 hours using less than the theoretical amount of sodium hydroxide.

TABLE 2.—EFFECT OF CAUSTIC CONCENTRATION ON HYDROLYSIS OF POLYACRYLONITRILE

| | Mols NaOH per mol acrylonitrile | Hydrolysis time, hrs. | Composition | | |
|---|---|---|---|---|---|
| | | | CN | CONH$_2$ | CO$_2$H |
| 1 | 0.3 | 19 | 12 | 30 | 58 |
| 2 | 0.5 | 17 | 3 | 30 | 67 |
| 3 | 0.6 | 17 | | 32 | 68 |
| 4 | 0.7 | 17 | | 32 | 68 |
| 5 | 0.9 | 17 | | 29 | 71 |

In producing the product, molecular weights are determined by measuring intrinsic viscosity. The following procedure can be used for this purpose:

Polyacrylonitrile is dissolved in dimethyl formamide at room temperature. Ten (10) mls. of solution is added by pipette to a Cannon-Ubbelohde viscometer and the time required for a standard volume to pass through the capillary is measured. Concentrations of solution are chosen so that the initial time is greater than 500 sec. The concentration of polyacrylonitrile in DMF is decreased to .67, .50, .40, and .25 times the initial concentration. The time required for these solutions to pass through the capillary is measured. Specific viscosity is calculated according to the following formula:

$$\eta_{sp}=\frac{t_p-t_s}{t_s}$$

where $\eta_{sp}$=specific viscosity
$t_p$=time for polymer solution to pass through capillary
$t_s$=time for solvent to pass through capillary.

Intrinsic viscosity was obtained by graphing $$\frac{\eta_{sp}}{C}\text{ vs. } C$$

where C=concentration and extrapolating to 0 concentration.

Molecular weight was calculated from the Staudinger equation:

$$[n]=kM_d$$

where $k$ and $d$ are constants.

$[n]$=intrinsic viscosity
and
$M$=molecular weight for polyacrylonitrile, $$k=2.43\times 10^{-4}$$

and $$d=0.75$$

Determining product composition

Product composition can be determined by infrared analysis by comparison of carboxylate vs. amide lines or by titration with strong acid. Of the two procedures, infrared analysis is more rapid and was used in this work.

Standards were obtained by polymerizing recrystallized acrylamide and distilled acrylic acid in aqueous solution as homopolymers. The polyacrylic acid was neutralized with $CO_2$ free sodium hydroxide and then mixtures of known composition were prepared from the sodium polyacrylate and the acrylamide. The mixture was then cast on an Irtran-2 plate and run on the IR-9. The relative heights of the 1575 and 1675 cm.$^{-1}$ peaks were compared at acrylic acid:acrylamide ratios of 90:10, 80:20, 70:30, 60:40, 50:50, 40:60, 30:70, 20:80, 10:90 and used to estimate composition of the hydrolyzed polyacrylonitriles.

EXAMPLE 2

In the experiments shown in this illustrative example dispersing agents of the subject invention were tested to determine their effectiveness. The test for establishing the dispersing effect of the additives on fine particles in suspension involved the rotation of a screen in a suspension. The weight of particles adhering to the screen and the relative stability of the suspension was determined at the conclusion of each test.

Equipment and materials

The screen employed in this test is made of 302 stainless steel. It has 40 mesh, with openings of 0.015 in. and wire of 0.01 in diameter. A section of screen 1 x 2 inches is used. A hole is punched ¼" in from the center of the long edge, to accommodate the 6/32 screw which holds the screen on the shaft. The shaft is a rod 2 inches long, ¼ inch in diameter. A 6/32 hole is drilled and tapped on a center ⅛ inch from the unattached end of the rod. Both hard rubber and stainless steel rods have been used. The rod is held in the chuck of a laboratory cone drive motor. The rod-screen assembly is rotated at 220 to 230 r.p.m.

A 600 ml. beaker is used to hold 500 ml. of Chicago tap water containing the suspended solids. The suspended solids employed in this work were either KA4 or γ iron oxide. The kaolin particle size was 0.1μ to 15μ with an average of about 0.5μ. The surface area of the kaolin was determined to be 30 sq. m./gram. The iron oxide was a pigment grade $\gamma$-$Fe_2O_3$. The particle size averages about 0.4μ.

Method

The screens are prepared for the test by first brushing thoroughly with a fiber bristle brush in running hot water, and then rinsing in D.I. water. It is important to avoid the use of any detergent. Excess water is removed by snapping the screens, and then drying for at least one-half hour at 140° F. After drying the screens are weighed to the nearest 0.1 mg. and then mounted on the shaft of the cone drive motors.

A weighed portion of foulant (250 mg.) is placed in a clean Osterizer. Five hundred (500) ml. of Chicago tap water at room temperature is added to the Osterizer and mixed for one minute. While the suspension is mixing, treatment is added to a 600 ml. beaker from a stock solution containing 0.50 gram of active material per 100 ml. After the suspension has been mixed, it is transferred to the beaker and then put in place beneath the stirring motor with the screen mounted on the shaft. The screen is lowered into the suspension, and the motor started.

Several tests may be run at the same time. The screen is rotated for one hour. At the end of this period, the screen is raised, and an absorbent towel touched to the bottom edge. The screen is removed from the shaft and suspended in an oven at 140° F. for at least one-half hour. The screen is reweighed to determine deposit weight. Screens are frequently examined by a 60X microscope to verify weight gains and make visual comparison. The deposit weights obtained in tests without additives were 3.4 to 3.6 mg. with $\gamma$-$Fe_2O_3$, and 1.6 to 1.8 mg. with kaolin.

At the conclusion of the tests the beakers are set aside and observed for stability of suspension or flocculation. A kaolin blank will completely settle out overnight, whereas with 1 p.p.m. of an effective dispersant it will remain turbid for several days. The settling rate of iron oxide is much faster, the untreated blank drops out in less than an hour, while a treated suspension takes 2 to 4 hours.

In the table below the dispersing properties of 13 compositions are set forth. The 13 compositions tested were as follows:

Composition 1.—Acrylic acid monomer.
Composition 2.—Acrylonitrile monomer.
Composition 3.—Hydrolyzed polyacrylonitrile, molecular weight 13,000, 25% amide, 75% acid.
Composition 4.—Hydrolyzed polyacrylonitrile, 19,000 molecular weight, 30% amide, 70% acid.
Composition 5.—Hydrolyzed polyacrylonitrile, 19,000 molecular weight, 23% amide, 77% acid.
Composition 6.—Hydrolyzed polyacrylonitrile, 19,000 molecular weight, 17% amide, 83% acid.
Composition 7.—Hydrolyzed polyacrylonitrile, 131,000 molecular weight, 30% amide, 70% acid.
Composition 8.—Hydrolyzed polyacrylonitrile, 553,000 molecular weight, 30% amide, 70% acid.
Composition 9.—Hydrolyzed polyacrylonitrile, 5,000,000 molecular weight, 20% amide, 80% acid.
Composition 10.—Causticized lignin.
Composition 11.—Causticized mangrove tannin.
Composition 12.—Sulfonated naphthalene.
Composition 13.—Carboxy methyl cellulose.

TABLE 3.—PERCENT REDUCTION IN DEPOSIT WEIGHT

| Composition No. | Kaolin | | Iron oxide, |
|---|---|---|---|
| | 2 p.p.m. | 1 p.p.m. | 1 p.p.m. |
| 1 | 0 | 0 | 0 |
| 2 | 0 | 0 | 0 |
| 3 | 75 | 70 | 83 |
| 4 | 97 | 70 | 94 |
| 5 | 97 | 97 | 94 |
| 6 | 0 | 55 | 89 |
| 7 | 55 | 25 | 66 |
| 8 | + | + | + |
| 9 | + | + | + |
| 10 | 88 | 55 | 0 |
| 11 | 75 | 70 | 0 |
| 12 | 60 | 35 | 0 |
| 13 | 75 | 70 | 0 |

+ Increase in deposit weight over the control.

Additional tests were carried out to establish further the effect of molecular weight with respect to the dispersion characteristics of hydrolyzed polyacrylonitrile polymers. The test conditions described above were used in connection with polymers of various molecular weights.

TABLE 4

| Number | Percent concentration | Molecular weight | Kaolin | | Iron oxide | |
|---|---|---|---|---|---|---|
| | | | 2 p.p.m. | 10 p.p.m. | 1 p.p.m. | 10 p.p.m. |
| 1 | 16 | 800 | [1]2 ([2]89%) | [1]1 ([2]94%) | [1]11 ([2]70%) | [1]5 ([2]86%) |
| 2 | 14 | 840 | [1]2 ([2]89%) | [1]1 ([2]94%) | [1]16 ([2]56%) | [1]4 ([2]89%) |
| 3 | 12.5 | 960 | [1]1 ([2]94%) | [1]1 ([2]94%) | [1]15 ([2]58%) | [1]3 ([2]92%) |
| 4 | 10 | 1,100 | [1]5 ([2]72%) | [1]1 ([2]94%) | [1]15 ([2]58%) | [1]8 ([2]78%) |
| 5 | 15.6 | 1,800 | [1]2 ([2]89%) | [1]3 ([2]83%) | [1]12 ([2]67%) | [1]1 ([2]97%) |
| 6 | 6 | 2,000 | [1]3 ([2]83%) | [1]1 ([2]94%) | [1]2 ([2]95%) | [1]3 ([2]92%) |
| 7 | 16 | 2,000 | [1]2 ([2]89%) | [1]2 ([2]89%) | [1]23 ([2]36%) | [1]1 ([2]97%) |
| 8 | 21 | 3,500 | [1]2 ([2]89%) | [1]2 ([2]89%) | [1]1 ([2]97%) | [1]2 ([2]95%) |
| 9 | 12.5 | 3,150 | [1]3 ([2]83%) | [1]2 ([2]83%) | [1]1 ([2]97%) | [1]1 ([2]97%) |
| 10 | 21 | 12,500 | [1]3 ([2]83%) | [1]1 | [1]3 ([2]92%) | [1]2 ([2]95%) |
| 11 | 10 | 20,000 | [1]3 ([2]83%) | [1]2 | [1]17 ([2]53%) | [1]3 ([2]92%) |
| 12 | 10 | 22,000 | [1]8 ([2]56%) | [1]15 | [1]7 ([2]81%) | [1]2 ([2]95%) |
| 13 | 20 | 24,000 | [1]5 ([2]72%) | [1]4 | [1]19 ([2]47%) | [1]3 ([2]92%) |
| 14 | 13 | 34,000 | [1]10 ([2]44%) | [1]18 | [1]20 ([2]45%) | [1]2 ([2]95)% |
| 15 | 13 | 43,000 | 151 | 175 | | |
| 16 | 4 | 72,500 | 115 | 159 | | |

[1] Tenths of mg. of deposit.
[2] Percent reduction in deposit weight.

The above results are set forth in FIGS. 1 and 2 of the attached drawing in which:

FIG. 1 is a graph showing the activity of 1 p.p.m. hydrolyzed polyacrylonitrile wherein molecular weight and reduction in iron oxide deposits are compared; and FIG. 2 is a graph showing the activity of 2 p.p.m. hydrolyzed polyacrylonitrile wherein molecular weight and reduction in kaolin deposits are compared.

The test method employed in the study of the dispersing effect of hydrolyzed polyacrylonitrile also evaluates the effect on adherence of solid particles to surfaces. This essentially simulates the phenomenon occurring in aqueous systems such as once-through cooling water systems. The charge on the suspended particles is increased. This decreases the tendency of particles to coalesce and settle out, or adhere to surfaces.

As is apparent from the above results, the molecular weight of the hydrolyzed polyacrylonitrile is of critical importance as is the composition of the polymer. If the dispersant is of the character described herein, it will act as a dispersant or suspending agent and not as a flocculating or coagulating agent. This is an important distinction between the subject dispersants and the flocculating agents of the prior art.

Typical properties of a dispersant of the subject invention are given in the following table:

| | |
|---|---|
| Color | Straw. |
| Odor | Ammoniacal. |
| Viscosity | 70–100 c.p.s. |
| pH | 12.5 |
| Density | 1.166 g./cc. (26° C.) |
| Pounds per gallon | 9.75. |
| Corrosivity | 3.2/0.25 m.p.y. |
| Drum liners | Rheem 9672C IC136. |
| Flash point | High (water is the only solvent used). |
| Freezing point | Not determined, but no change at 40° F. |

The subject dispersants maintain the particle size of the suspended solids at a substantially constant level. The process is operable on particles falling within a wide size range. The diameter of the particles will be between about 0.1 and 2000 microns, more often will be between 0.2 and 1000 microns, and still more often will be between 50 and 800 microns.

Obviously many modifications and variations of the invention as hereinbefore set forth may be made without departing from the spirit and scope thereof, and therefore only such limitations should be imposed as are indicated in the appended claims.

I claim:

1. A process for maintaining a suspension of solids in water which comprises: adding to the water from about 0.1 to 100 p.p.m. of a hydrolyzed polyacrylonitrile having a molecular weight of 800 to 40,000 and having side groups 20–30% of which are amide groups and from 7–80% are carboxyl groups, said polymer being further characterized by its substantial freedom from flocculating properties.

2. A process as in claim 1 wherein said polymer has a molecular weight of from 800 to 30,000.

3. A process as in claim 1 wherein said polymer has a molecular weight of from 5,000 to 30,000.

4. A process for maintaining an aqueous suspension of solids in water which comprises: adding to said water from about 0.5 to 10 p.p.m. of a hydrolyzed polyacrylonitrile, said polymer having a molecular weight of from 5,000 to 40,000 and having from 20–30% amide groups and from 70–80% carboxyl groups, said polymer being further characterized by its substantial freedom from flocculating properties, said solids being characterized by their ability to become attached to said polymer through hydrogen bonding.

5. A process for preventing fouling and corrosion due to deposits in water cooled industrial heat exchangers and cooling systems which comprises: treating the cooling water passing through said cooling system by adding to said water from about 0.1 to 100 p.p.m. of a hydrolyzed polyacryonitrile, said polymer having a molecular weight of 800 to 40,000 and having from 20–30% amide groups and from 70–80% carboxyl groups, said polymer being further characterized by its substantial freedom from flocculating properties.

6. A process as in claim 5 wherein said polymer has a molecular weight of from 5,000 to 30,000.

7. A process for dispersing solids in an aqueous system which comprises: adding to said aqueous system containing accumulated solids from about 0.1 to 100 p.p.m. of a hydrolyzed polyacrylonitrile having a molecular weight of 800 to 40,000 and having side groups 20–30% of which are amide groups and from 70–80% are carboxyl groups.

8. A process as in claim 7 wherein the diameter of the particles to be dispersed varies between about 0.1 and 2,000 microns.

References Cited

UNITED STATES PATENTS 3,085,916   4/1963   Zimmie et al. _____ 210—58

LEON D. ROSDOL, *Primary Examiner.*

W. E. SCHULTZ, *Assitant Examiner.*

U.S. Cl. X.R.

134—22; 210—58

UNITED STATES PATENT OFFICE
CERTIFICATE OF CORRECTION

Patent No. 3,419,502                 December 31, 1968

Theodore R. Newman

It is certified that error appears in the above identified patent and that said Letters Patent are hereby corrected as shown below:

Column 2, line 34, "system" should read -- systems --.
Column 8, line 29, "7" should read -- 70 --.

Signed and sealed this 21st day of April 1970.

(SEAL)
Attest:

Edward M. Fletcher, Jr.
Attesting Officer

WILLIAM E. SCHUYLER, JR.
Commissioner of Patents